United States Patent
Mori

(10) Patent No.: US 10,419,628 B2
(45) Date of Patent: Sep. 17, 2019

(54) PRINTER AND RECORDING MEDIUM

(71) Applicant: Brother Kogyo Kabushiki Kaisha, Nagoya-shi, Aichi-ken (JP)

(72) Inventor: Hiroko Mori, Handa (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 16/143,824

(22) Filed: Sep. 27, 2018

(65) Prior Publication Data

US 2019/0182395 A1    Jun. 13, 2019

(30) Foreign Application Priority Data

Dec. 8, 2017    (JP) .................................. 2017-235847

(51) Int. Cl.
*H04N 1/00*      (2006.01)
*G06F 3/12*      (2006.01)
*G06F 1/16*      (2006.01)

(52) U.S. Cl.
CPC ....... *H04N 1/00496* (2013.01); *G06F 1/1698* (2013.01); *G06F 3/1279* (2013.01)

(58) Field of Classification Search
None
See application file for complete search history.

(56) References Cited

U.S. PATENT DOCUMENTS

| | | | | |
|---|---|---|---|---|
| 5,666,530 A | * | 9/1997 | Clark | G06F 1/1626 |
| 2002/0180691 A1 | * | 12/2002 | Wong | G06F 1/1626 |
| | | | | 345/156 |
| 2016/0042337 A1 | | 2/2016 | Ota et al. | |

FOREIGN PATENT DOCUMENTS

| | | |
|---|---|---|
| JP | 4981549 B2 | 7/2012 |
| JP | 2016-048537 A | 4/2016 |

* cited by examiner

*Primary Examiner* — Lennin R Rodriguezgonzalez
(74) *Attorney, Agent, or Firm* — Banner & Witcoff, Ltd.

(57) ABSTRACT

The disclosure discloses printer including an attach/detach part and a control part. The control part executes a cable determination process. In the cable determination process, it is determined whether or not a first communication cable is attached to the attach/detach part. In accordance with a determination result, the control part selectively executes either an enabling process or a disabling process. In the enabling process, a communication bus to the first communication cable included in the control part is enabled. In the disabling instruction process, a disabling instruction is outputted to the cradle apparatus for disabling a communication bus to the first communication cable. In the disabling process, the communication bus to the first communication cable included in the control part is disabled. In the enabling instruction process, an enabling instruction is outputted to the cradle apparatus for enabling the communication bus to the first communication cable.

7 Claims, 5 Drawing Sheets

[FIG. 1]
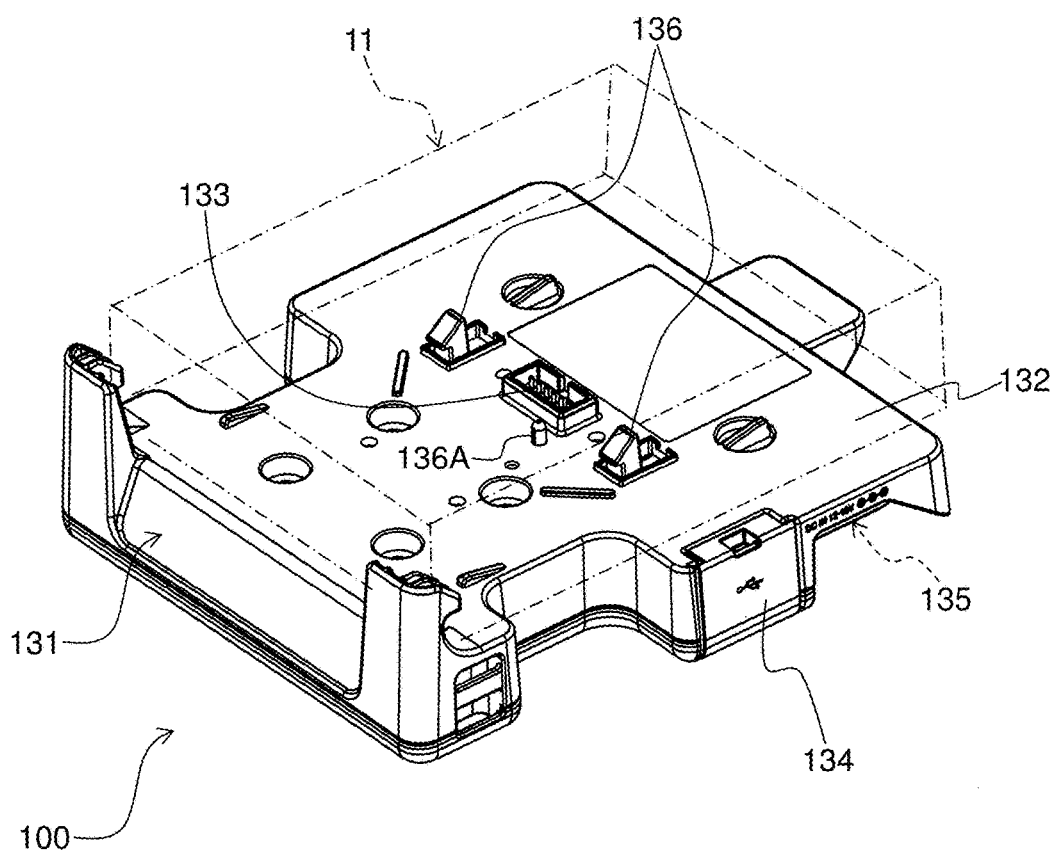

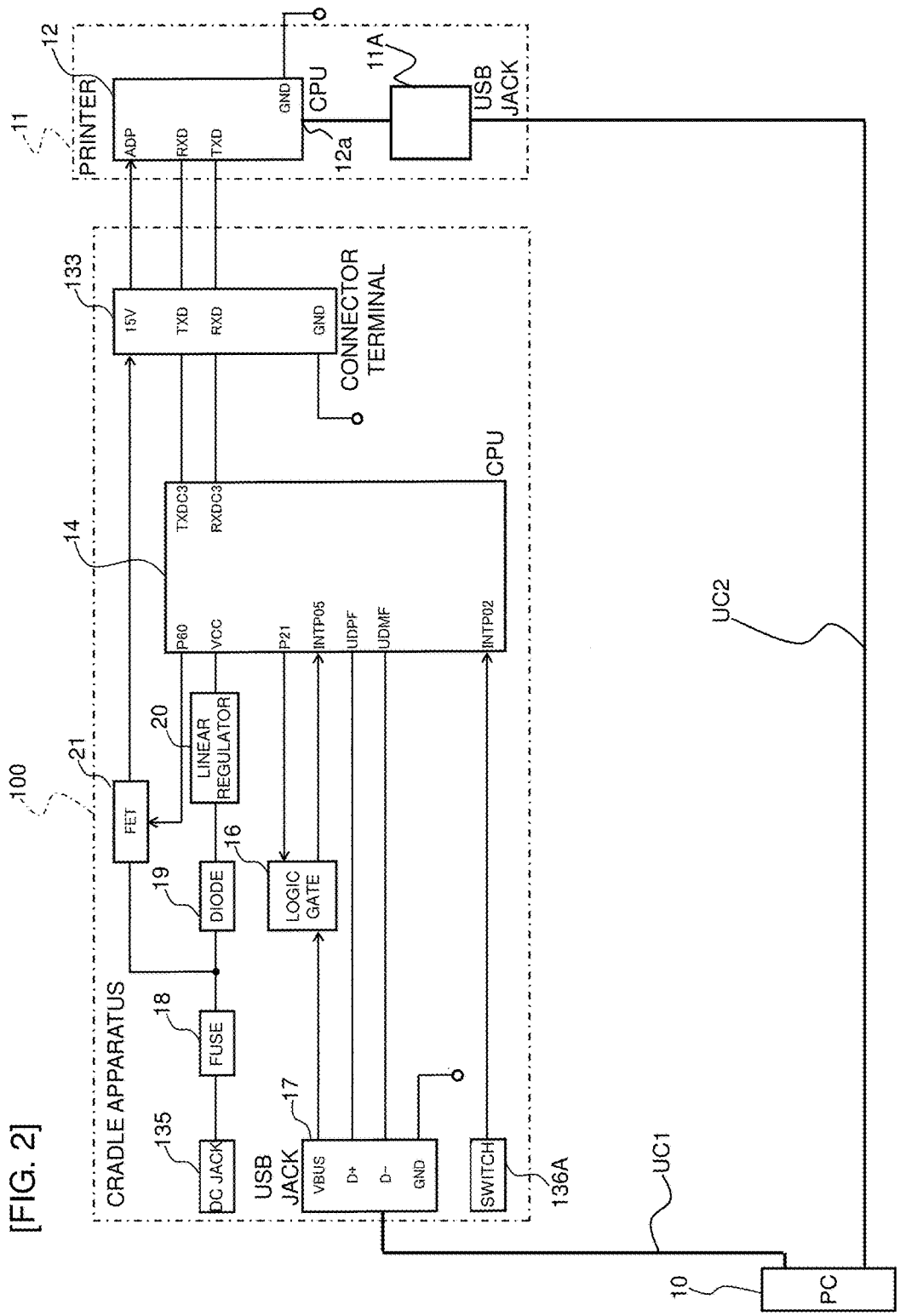
[FIG. 2]

[FIG. 3A]

INPUT/OUTPUT SIGNAL

| CPU PORT | FUNCTION NAME | INPUT/OUTPUT | LOGIC "0" | LOGIC "1" |
|---|---|---|---|---|
| P21 | USBF_ON | OUTPUT | USB UNUSABLE | USB USABLE |
| INTP05 | CPU_VBUS | INPUT | USB CONNECTION DETECTED | USB UNCONNECTED |
| UDPF | CPU_UDP | INPUT/OUTPUT | USB FUNCTION DATA SIGNAL LINE D+ | |
| UDMF | CPU_UDM | INPUT/OUTPUT | USB FUNCTION DATA SIGNAL LINE D- | |

[FIG. 3B]

POWER SOURCE OUTPUT TO PRINTER

| CPU PORT | FUNCTION NAME | INPUT/OUTPUT | LOGIC "0" | LOGIC "1" |
|---|---|---|---|---|
| P60 | POWER SOURCE OUTPUT | OUTPUT | OFF | ON |

[FIG. 3C]

PRINTER ATTACHMENT DETECTION SWITCH

| CPU PORT | FUNCTION NAME | INPUT/OUTPUT | "H" | "L" |
|---|---|---|---|---|
| INTP02 | PRINTER ATTACHMENT DETECTION | INPUT | NOT CONNECTED | CONNECTED |

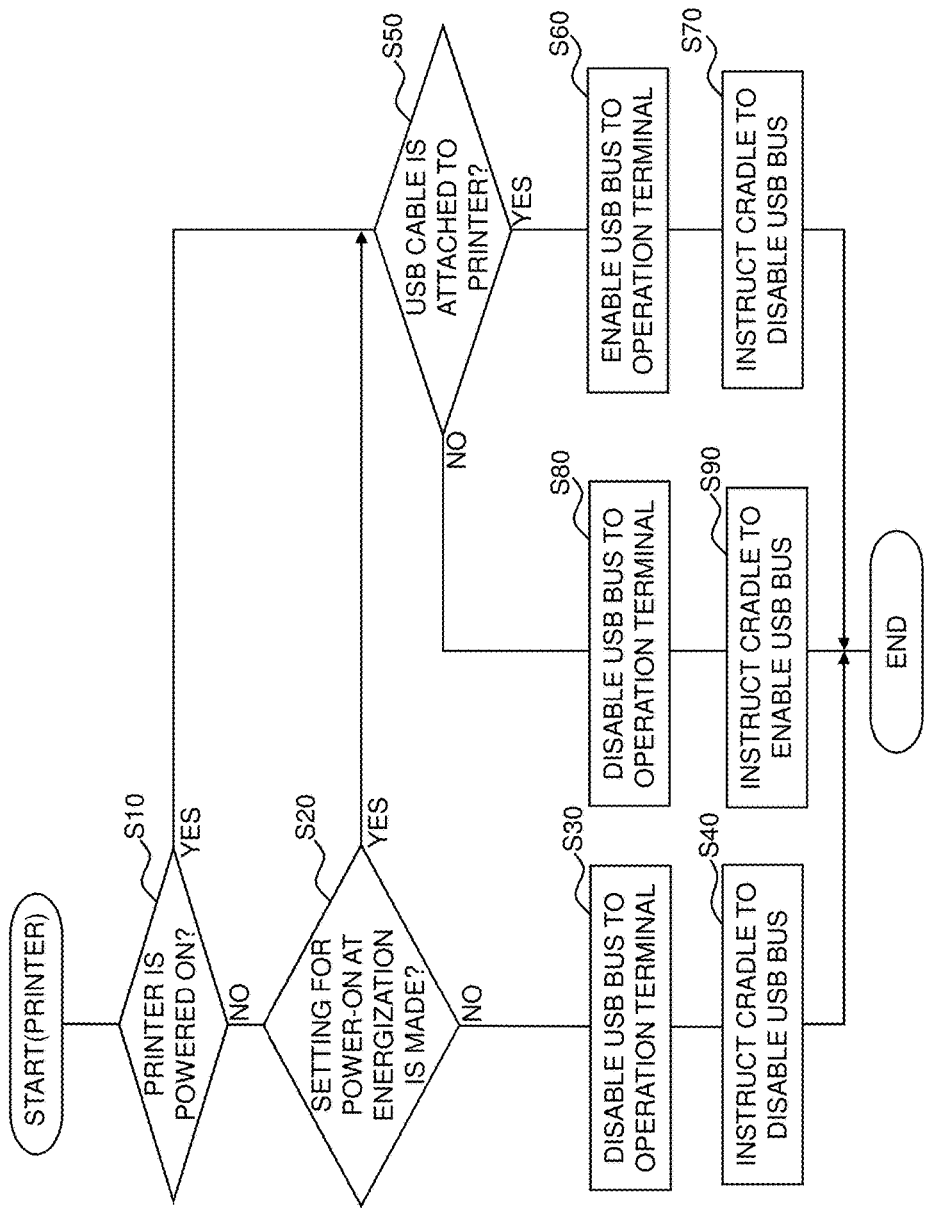
[FIG. 4]

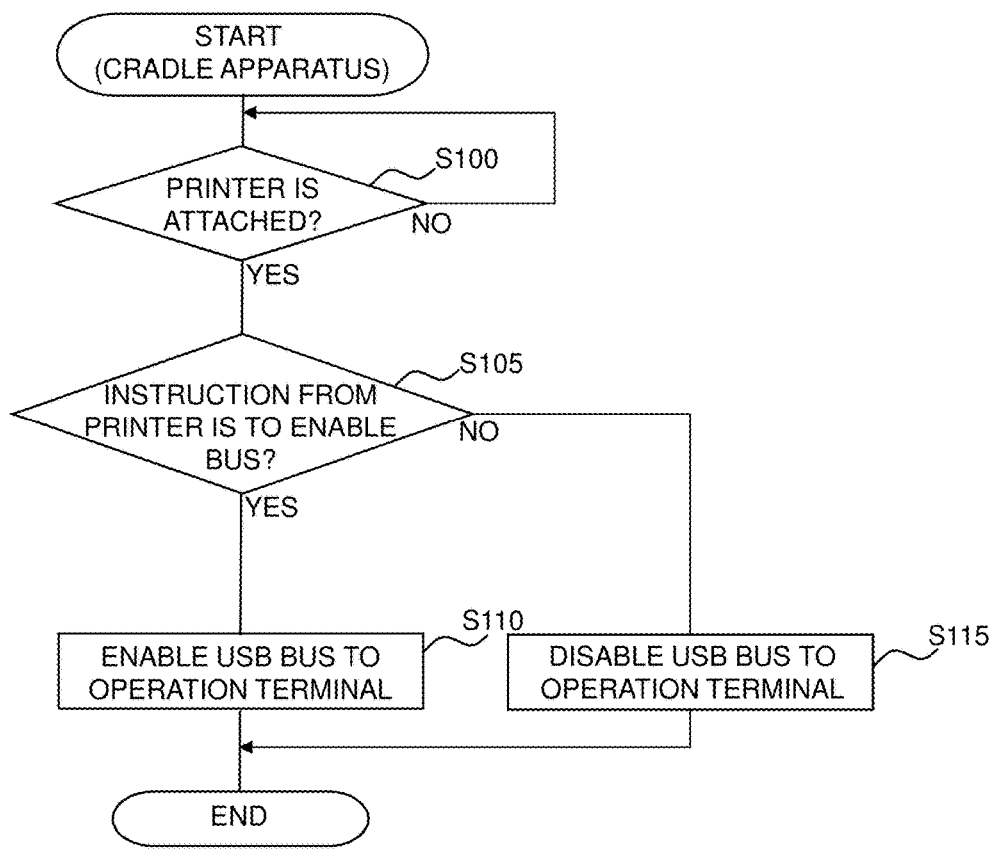

PRINTER AND RECORDING MEDIUM

CROSS-REFERENCE TO RELATED APPLICATION

The present application claims priority from Japanese Patent Application No. 2017-235847, which was filed on Dec. 8, 2017, the disclosure of which is incorporated herein by reference in its entirety.

BACKGROUND

Field

The present disclosure relates to a printer attached in an information transmittable and receivable manner to a cradle apparatus connected to an operation terminal, and a recording medium storing a connection processing program executed by the printer.

Description of the Related Art

A cradle apparatus allowing attachment of a printer in an information transmittable and receivable manner is known. This cradle apparatus is network-connected via a LAN to an operation terminal (tablet terminal) and has a function of converting and transmitting a signal from the operation terminal to an attached printer (mobile printer) and conversely converting and transmitting a signal from the printer to the operation terminal.

Regarding the cradle apparatus, as described above, the cradle apparatus is connected through a communication cable to the operation terminal in an information transmittable and receivable manner, while the printer is configured to be connectable through a communication cable to the operation terminal in an information transmittable and receivable manner. Therefore, in the case that both the cradle apparatus and the printer are connected to the operation terminal, the operation terminal may become difficult or unable to recognize which one of the devices should be prioritized in communication. Particularly, for example, in the case that connection identification information for communication connection is the same between the printer and the cradle apparatus, the operation terminal cannot recognize the printer and the cradle apparatus in a distinguishable manner. In another case, the cradle apparatus is meaninglessly recognized by the operation terminal even though the main power supply of the printer is not turned on. In either case, it is difficult for the operation terminal to correctly recognize the device to be communicated and perform favorable communication.

SUMMARY

An object of the present disclosure is to provide a printer and a recording medium allowing an operating terminal connected through a communication cable to both a cradle apparatus and the printer to correctly recognize a device to be communicated and perform favorable communication.

In order to achieve the above-described object, according to the first aspect of the present application, there is provided a printer configured to be attached in an information transmittable and receivable manner to a cradle apparatus connected to an operation terminal via a first communication cable, comprising an attach/detach part configured to attach and detach the first communication cable to the operation terminal, and a control part, the control part being configured to execute a cable determination process for determining whether or not the first communication cable is attached to the attach/detach part, and in accordance with a determination result in the cable determination process, being configured to selectively execute, either (i) an enabling process for enabling a communication bus to the first communication cable included in the control part, and a disabling instruction process for outputting a disabling instruction to the cradle apparatus for disabling a communication bus to the first communication cable, or (ii) a disabling process for disabling the communication bus to the first communication cable included in the control part, and an enabling instruction process for outputting an enabling instruction to the cradle apparatus for enabling the communication bus to the first communication cable.

In order to achieve the above-described object, according to the second aspect of the present application, there is provided a printer configured to be attached in an information transmittable and receivable manner to a cradle apparatus connected to an operation terminal via a first communication cable, comprising an attach/detach part configured to attach and detach the first communication cable to the operation terminal, and a control part, the control part having, as a control mode, a power-on mode in which a main power supply of the printer is automatically turned on in the case that the printer is attached to the cradle apparatus while the main power supply is not turned on, and a normal mode in which the main power supply is not automatically turned on even in the case that the printer is attached to the cradle apparatus while the main power supply is not turned on, and wherein the control part is configured to further execute a power supply determination process for determining whether or not the main power supply of the printer is turned on, and a mode determination process for determining whether the control mode is the power on mode or the normal mode, and configured to execute, on condition that it is determined that the main power supply is not turned on in the power supply determination process and the control mode is the normal mode in the mode determination process, a disabling process for disabling a communication bus to the first communication cable included in the control part, and a disabling instruction process for outputting a disabling instruction to the cradle apparatus for disabling a communication bus to the first communication cable.

In order to achieve the above-described object, according to the third aspect of the present application, there is provided a non-transitory computer-readable recording medium storing a connection processing program for a computing part of a printer configured to be attached in an information transmittable and receivable manner to a cradle apparatus connected to an operation terminal via a first communication cable, the printer including an attach/detach part configured to attach and detach the first communication cable to the operation terminal, and the computing part, the connection processing program causing the computing part to execute a cable determination step for determining whether or not the first communication cable is attached to the attach/detach part, and in accordance with a determination result in the cable determination step, to selectively execute, either (iii) an enabling step for enabling a communication bus to the first communication cable included in the computing part, and a disabling instruction step for outputting a disabling instruction to the cradle apparatus for disabling a communication bus to the first communication cable, or (iv) a disabling step for disabling the communication bus to the first communication cable included in the computing part, and an enabling instruction step for outputting an enabling instruction to the cradle apparatus for enabling the communication bus to the first communication cable.

In order to achieve the above-described object, according to the fourth aspect of the present application, there is provided a non-transitory computer-readable recording medium storing a connection processing program for a computing part of a printer configured to be attached in an information transmittable and receivable manner to a cradle apparatus connected to an operation terminal via a first communication cable, the printer including an attach/detach part configured to attach and detach the first communication cable to the operation terminal, and the computing part, the connection processing program causing the computing part to execute a power supply determination step for determining whether or not the main power supply of the printer is turned on, and a mode determination step for determining whether the control mode is the power on mode or the normal mode, and to execute on condition that it is determined that the main power supply is not turned on in the power supply determination step and the control mode is the normal mode in the mode determination step, a disabling step for disabling a communication bus to the first communication cable included in the computing part, and a disabling instruction step for outputting a disabling instruction to the cradle apparatus for disabling a communication bus to the first communication cable.

BRIEF DESCRIPTION OF THE DRAWINGS

FIG. 1 is a perspective view showing an overall structure of a cradle apparatus according to an embodiment of the present disclosure.

FIG. 2 is a circuit diagram showing a circuit configuration of the cradle apparatus and a printer.

FIG. 3A is an explanatory diagram showing detailed functions of input/output signals at ports of a CPU of the cradle apparatus.

FIG. 3B is an explanatory diagram showing detailed functions of input/output signals at ports of the CPU of the cradle apparatus.

FIG. 3C is an explanatory diagram showing detailed functions of input/output signals at ports of the CPU of the cradle apparatus.

FIG. 4 is a flowchart showing a control procedure executed by a CPU of the printer.

FIG. 5 is a flowchart showing a control procedure executed by the CPU of the cradle apparatus.

DETAILED DESCRIPTION OF THE PREFERRED EMBODIMENTS

An embodiment of the present disclosure will now be described with reference to the drawings.
<General Configuration of Cradle Apparatus>
FIG. 1 is a perspective view showing a cradle apparatus of this embodiment. In FIG. 1, a cradle apparatus 100 has a housing 131.

An upper surface of the housing 131 has a planar placement part 132 formed such that, for example, a mobile printer 11 (corresponding to an example of a printer) of this embodiment can be placed and attached. At substantially the center of the upper surface of the placement part 132, a locking mechanism 136 is disposed as a pair of left and right portions projecting upward from the placement part 132. A printer detection switch 136A (see also FIG. 2 described later) is disposed on a base portion of the lock mechanism 136. On the other hand, an electrode terminal not shown is disposed on a bottom surface of the printer 11. Correspondingly, a connector terminal 133 for transmitting/receiving information to/from the printer 11 is disposed on the placement part 132 at a position facing the electrode terminal when the printer 11 is attached.

A jack cover 134 and a DC jack 135 (see also FIG. 2 described later) for connecting to a DC power source are disposed on a side surface of the housing 131. A USB jack 17 (corresponding to an example of an attach/detach part: see FIG. 2 described later) is stored inside the jack cover 134, and a USB cable UC1 (corresponding to an example of a first communication cable: see FIG. 2 described later) can be attached to and detached from the USB jack 17. The cradle apparatus 100 is connected through the USB cable UC1 to an operation terminal 10 (see FIG. 2 described later) including, for example, a personal computer, in an information transmittable and receivable manner. By opening the jack cover 134, the USB jack 17 is exposed to the outside of the housing 131 and becomes usable. A DC plug connected to an external power source device not shown is attached to the DC jack 135, and electric power from the external power source device is thereby supplied into the cradle apparatus 100. By supplying this electric power to the printer 11 via the connector terminal 133, the printer 11 can also be charged. The printer 11 includes a USB jack 11A (corresponding to an example of the attach/detach part) to which a USB cable UC2 (corresponding to an example of a second communication cable) can detachably attached, and this USB jack 11A is connected through a USB cable UC2 to the operation terminal 10 in an information transmittable and receivable manner (see FIG. 2 described later).

When the printer 11 is placed on the placement part 132 of the cradle apparatus 100 having the configuration described above, the printer 11 is locked by the lock mechanism 136, and the printer detection switch 136A is put into an "ON" state. The electrode terminal of the printer 11 is fitted to the connector terminal 133 of the cradle apparatus 100, so that the electrode terminal and the connector terminal 133 are electrically connected (made conductive), which enables the printer 11 and the cradle apparatus 100 to transmit and receive information.
<Circuit Configuration>
FIG. 2 is a circuit diagram showing a circuit configuration of the cradle apparatus 100.

In a circuit shown in FIG. 2, the cradle apparatus 100 includes a CPU 14, the connector terminal 133, the USB jack 17 connected to the operation terminal 10 (abbreviated as "PC" in the figure), the DC jack 135, and the printer detection switch 136A.

The DC jack 135 is connected through a fuse 18, a diode 19, and a linear regulator 20 to a "VCC" port of the CPU 14. A power supply circuit branched from between the fuse 18 and the diode 19 is connected through a FET 21 to a "15V" port of the connector terminal 133. This "15V" port is further connected to an "ADP" port for automatic data processing of the CPU 12 (corresponding to an example of a control part and a computing part) included in the printer 11. The FET 21 is controlled by a control signal from a "P60" port of the CPU 14. Therefore, as shown in FIG. 3B, when the signal output from the "P60" port is "1", the FET 21 is turned on, and power is supplied to the printer 11 through the path described above. When the signal outputted from the "P60" port is "0", the FET 21 is turned off, resulting in a cutoff state without power supply.

A "TXDC3" port for information transmission of the CPU 14 is connected to a "TXD" port for information transmission of the connector terminal 133, and the "TXD" port is further connected to an "RXD" port for information reception of the CPU 12. An "RXDC3" port for information reception of the CPU 14 is connected to an "RXD" port for information reception of the connector terminal 133, and the "RXD" port is further connected to a "TXD" port for information transmission of the CPU 12. In this way, each of the "TXD" ports is connected by a so-called UART (abbreviation for Universal Asynchronous Receiver Transmitter, which is a type of a serial communication device) connected to the "RXD" port of the partner. To send 1-byte 8-bit data, the data is decomposed in time series and output (transmitted) or input (received) by one bit at a time.

Both the connector terminal 133 and the CPU 12 of the printer 11 are grounded at "GND" ports.

On the other hand, a "VBUS" port of the USB jack 17 is connected via a logic gate 16 to an "INTP05" port of the CPU 14. A "P21" port of the CPU 14 is connected to the logic gate 16, and the logic gate 16 is controlled by a control signal (hereinafter referred to as a "USBF_ON" signal as appropriate) from the "P21" port of the CPU 14.

Therefore, as shown in FIG. 3A, when the "USBF_ON" signal output from the "P21" port is "1", the logic gate 16 is turned on (into a signal transmission state) so that a signal can be transmitted from the "VBUS" port or the USB jack 17 to the "INTP05" port of the CPU 14. As a result, as shown in FIG. 3A, the signal input to the "INTP05" port is "0" corresponding to a USB-connection-detected state so that the cradle apparatus 100 and the operation terminal 10 can electrically be connected by using the USB cable UC1 attached to the USB jack 17.

On the other hand, when the "USBF_ON" signal output from the "P21" port is "0", the logic gate 16 is turned off (into a signal cutoff state) so that a signal cannot be transmitted from the "VBUS" port of the USB jack 17 to the "INTP05" port of the CPU 14. As a result, as shown in FIG. 3A, the signal input to the "INTP05" port is "1" corresponding to a USB-unconnected state so that the electrical connection using the USB cable UC1 attached to the USB jack 17 is cut off between the cradle apparatus 100 and the operation terminal 10.

A "D+" port of the USB jack 17 is connected to an "UDPF" port of the CPU 14, and as shown in FIG. 3A, the CPU 14 identifies a USB function data signal line to the "D+" port at this "UDPF" port. Similarly, a "D−" port of the USB jack 17 is connected to a "UDMF" port of the CPU 14, and as shown in FIG. 3A, the CPU 14 identifies a USB function data signal line to the "D−" port at this "UDMF" port. The USB jack 17 is also grounded at "GND".

The printer detection switch 136A is connected to an "INTP02" port of the CPU 14. In the case that the printer 11 is attached to the placement part 132, as shown in FIG. 3C, the signal output from the printer detection switch 136A and input to the "INTP02" port is in a "Low" state indicative of attachment of the printer 11. When the printer 11 is detached from the placement part 132, as shown in FIG. 3C, the signal output from the printer detection switch 136A and input to the "INTP02" port is in a "High" state indicative of non-attachment of the printer 11. In this way, whether or not the printer 11 is attached to the placement part 132 is determined by using "High" and "Low" input of the signal at the "INTP02" port. The attachment of the printer 11 may be detected on condition that both the "Low" state of the signal from the printer detection switch 136A and the signal input from the printer 11 via the connector terminal 133 are present. This can prevent erroneous detection of the attachment of the printer 11, for example, when a user presses the printer detection switch 136A by hand.

Although not shown in FIG. 2, the printer 11 includes a ROM as a recording medium. The ROM stores various control programs required for the printer 11 to operate, including a connection processing program for executing a flowchart shown in FIG. 4 described later. The CPU 12 controls the parts in accordance with the program read from the ROM and executes the flowchart shown in FIG. 4 described later.

Similarly, the cradle apparatus 100 includes a ROM as a recording medium. The ROM stores various control programs required for the cradle apparatus 100 to operate, including a program for executing a flowchart shown in FIG. 5 described later. The CPU 14 controls the parts in accordance with the program read from the ROM and executes the flowchart shown in FIG. 5 described later.

<Background and Outline of Embodiment>

In this embodiment, the cradle apparatus 100 is connected to the operation terminal 10 through the USB cable UC1 in an information transmittable and receivable manner, and the printer 11 is connected to the operation terminal 10 through the USB cable UC2 (corresponding to an example of the second communication cable) in an information transmittable and receivable manner. Therefore, in the case that both the cradle apparatus 100 and the printer 11 are connected to the operation terminal 10, the operation terminal 10 may become difficult or unable to recognize which one of the devices should be prioritized in communication. Particularly, for example, in the case of performing a technique in which the cradle apparatus 100 acquires and transmits connection identification information of the printer 11 (e.g., a vendor ID, a product ID, a vendor string, a product string, a device ID, or a serial number related to the printer 11) to the operation terminal 10 to establish the communication connection (electrical connection) between the cradle apparatus 100 and the operation terminal 10, the connection identification information is the same between the printer 11 and the cradle apparatus 100. In this case, the operation terminal 10 cannot recognize the printer 11 and the cradle apparatus 100 in a distinguishable manner.

Therefore, in this embodiment, a communication connection with the operation terminal 10 is established for one of the printer 11 and the cradle apparatus 100 without establishing a communication connection with the operation terminal 10 for the other, so that the operation terminal 10 can always reliably identify the device to be communicated. The details will hereinafter be described in order.

<Control Flow of Printer>

A control procedure executed by the CPU 12 of the printer 11 for the above implementation will be described with respect to the flowchart shown in FIG. 4.

First, at step S10, the CPU 12 uses a known technique to determine whether or not the power supply (main power supply) of the printer 11 is turned on. If the power supply is turned on, the determination is affirmative (S10: YES), and the procedure goes to step S50. Step S10 corresponds to an example of a power supply determination step described in claims, and the process executed at step S10 corresponds to an example of a power supply determination process described in claims.

At step S50, the CPU 12 uses a known technique to determine whether or not the USB cable UC2 is attached to the USB jack 11A. If not attached, the determination of step S50 is negative (S50: NO), and the procedure goes to step S80 described later. If attached, the determination of step S50 is affirmative (S50: YES), and the procedure goes to step S60.

Step S50 corresponds to an example of a cable determination step described in claims, and the process executed in step S50 corresponds to an example of a cable determination process.

At step S60, the CPU 12 enables a USB bus to the operation terminal 10. Specifically, the CPU 12 uses a known technique to execute a process of enabling a communication bus of the port 12a to the USB jack 11A leading to the USB cable UC2 (=establishing communication connection). Step S60 corresponds to an example of an enabling step described in claims, and the process executed in step S60 corresponds to an example of an enabling process. Subsequently, the procedure goes to step S70.

At step S70, the CPU 12 outputs through another path not shown in FIG. 2 a control signal instructing the CPU 14 of the cradle apparatus 100 to disable a communication bus to the USB cable UC1 connected to the cradle apparatus 100 (described later in detail). Step S70 corresponds to an example of a disabling instruction step described in claims, and the process executed at step S70 corresponds to an example of a disabling instruction process. Subsequently, this flow is terminated.

On the other hand, at step S80 after the negative determination at the above step S50, the CPU 12 disables a USB bus to the operation terminal 10. Specifically, the CPU 12 uses a known technique to execute a process of disabling a communication bus of the port 12a to the USB jack 11A leading to the USB cable UC2 (=disconnecting communication connection). Step S80 corresponds to an example of a disabling step described in claims, and the process executed at step S80 corresponds to an example of a disabling process. Subsequently, the procedure goes to step S90.

At step S90, the CPU 12 outputs through another path not shown in FIG. 2 a control signal instructing the CPU 14 of the cradle apparatus 100 to enable the communication bus to the USB cable UC1 connected to the cradle apparatus 100 (described later in detail). Step S90 corresponds to an example of an enabling instruction step described in claims, and the process executed at step S90 corresponds to an example of an enabling instruction process. Subsequently, this flow is terminated.

On the other hand, if the printer 11 is not powered on, the determination is negative at step S10 (S10: NO), and the procedure goes to step S20.

At step S20, the CPU 12 determines whether or not a power-on mode is set in the printer 11. Specifically, the printer 11 has a power-on mode in which the printer 11 is automatically powered on in the case that the printer 11 not in a power-on state is attached to the cradle apparatus 100, and a normal mode in which the printer 11 is not automatically powered on even in the case that the printer 11 not in a power-on state is attached to the cradle apparatus 100. Either of the two operation modes is selectively set, for example, through a user's appropriate operation on the operation terminal (abbreviated as "PC" in FIG. 2) 10 or the printer 11. If the power-on mode is set at step S20, the determination is affirmative (S20: YES), and the procedure goes to step S50 to perform the procedure described above. In the case that the normal mode is set at step S20, the determination of step S20 is negative (S20: NO), and the procedure goes to step S30. Step S20 corresponds to an example of a mode determination step described in claims, and the process executed at step S20 corresponds to an example of a mode determination process described in claims.

At step S30, the CPU 12 uses a known technique to execute a process of disabling the communication bus of the port 12a to the USB jack 11A leading to the USB cable UC2 as in step S80. Step S30 also corresponds to an example of the disabling step described in claims, and the process executed at step S30 also corresponds to an example of the disabling process. Subsequently, the procedure goes to step S40.

At step S40, the CPU 12 outputs a control signal instructing the CPU 14 of the cradle apparatus 100 to disable the communication bus to the USB cable UC1 as in step S70. Step S40 also corresponds to an example of the disabling instruction step described in claims, and the process executed at step S40 corresponds to an example of the disabling instruction process. Subsequently, this flow is terminated.

<Control Flow of Cradle Apparatus>

A flowchart of FIG. 5 shows a control procedure executed by the CPU 14 of the cradle apparatus 100 correspondingly to the flow of FIG. 4.

In FIG. 5, first, at step S100, the CPU 14 determines whether or not the printer 11 is attached to the placement part 132. Specifically, as described above, it is determined whether or not the signal input to the "INTP02" port from the printer detection switch 136A is "Low". If not attached, the determination of step S100 is negative (S5:NO), and the CPU 14 waits in a loop until the printer 11 is attached to the placement part 132. When the printer 11 is attached to the placement part 132, the determination of step S100 becomes affirmative (S5:YES), and the procedure goes to step S105.

At step S105, the CPU 14 determines whether or not contents of instruction from the printer 11 (at step S70 or S90 or S40) is enabling of the USB bus. If it is instructed to disable the USB bus at step S70 or S40, the determination of step S105 is negative (S105: NO), and the procedure goes to step S115 described later. In the case that it is instructed to enable the USB bus at step S60, the determination of step S105 is affirmative (S105: YES), and the procedure goes to step S110.

At step S110, the CPU 14 executes a process of enabling the communication bus to the USB cable UC1 leading to the operation terminal 11. Specifically, the CPU 14 outputs the "USBF_ON" signal of "1" from the "P21" port as described above to turn on the logic gate 16 (into a signal transmission state). As described above, this enables the signal transmission from the "VBUS" port of the USB jack 17 to the "INTP05" port of the CPU 14, and the communication connection (electrical connection) using the USB cable UC1 is established between the cradle apparatus 100 and the operation terminal 10. Subsequently, this flow is terminated.

On the other hand, at step S115, the CPU 14 executes a process of disabling the communication bus to the USB cable UC1 leading to the operation terminal 11. Specifically, the CPU 14 outputs the "USBF_ON" signal of "0" from the "P21" port as described above to turn off the logic gate 16 (into a signal cutoff state). As described above, this disables the signal transmission from the "VBUS" port of the USB jack 17 to the "INTP05" port of the CPU 14, and the communication connection (electrical connection) established at step S30 is disconnected between the cradle apparatus 100 and the operation terminal 10. Subsequently, this flow is terminated.

In the above description, the arrows shown in FIG. 2 indicate an example of a signal flow and are not intended to limit the signal flow directions.

The flowcharts shown in FIGS. 4 and 5 are not intended to limit the present disclosure to the procedures shown in the flow, and the procedures may be added/deleted or may be executed in different order without departing from the spirit and the technical ideas of the disclosure.

The techniques of the embodiment and modification examples may appropriately be utilized in combination other than those described above.

What is claimed is:

1. A printer configured to be attached in an information transmittable and receivable manner to a cradle apparatus connected to an operation terminal via a first communication cable, comprising:
    an attach/detach part configured to attach and detach said first communication cable to said operation terminal; and
    a control part,
    said control part being configured to execute a cable determination process for determining whether or not said first communication cable is attached to said attach/detach part, and
    in accordance with a determination result in said cable determination process, being configured to selectively execute, either
    (i) an enabling process for enabling a communication bus to said first communication cable included in said control part, and a disabling instruction process for outputting a disabling instruction to said cradle apparatus for disabling a communication bus to said first communication cable, or
    (ii) a disabling process for disabling the communication bus to said first communication cable included in said control part, and an enabling instruction process for outputting an enabling instruction to said cradle apparatus for enabling the communication bus to said first communication cable.

2. The printer according to claim 1, wherein
    said control part is configured to execute
    said enabling process and said disabling instruction process in the case that, in said cable determination process, it is determined that said first communication cable is attached, or
    said disabling process and said enabling instruction process in the case that, in said cable determination process, it is determined that said first communication cable is not attached.

3. The printer according to claim 2, wherein
    said control part is configured to further execute
    a power supply determination process for determining whether or not a main power supply of said printer is turned on, and configured to execute,
    on condition that it is determined that the printer is powered on in said power supply determination process,
    said enabling process and said disabling instruction process in the case that, in said cable determination process, it is determined that said first communication cable is attached, or
    said disabling process and said enabling instruction process in the case that, in said cable determination process, it is determined that said first communication cable is not attached.

4. The printer according to claim 3, wherein
    said control part has, as a control mode, a power-on mode in which said main power supply is automatically turned on in the case that said printer is attached to said cradle apparatus while said main power supply is not turned on, and a normal mode in which said main power supply is not automatically turned on even in the case that said printer is attached to said cradle apparatus while said main power supply is not turned on, and wherein
    said control part is configured to further execute
    a mode determination process for determining whether said control mode is said power-on mode or said normal mode, and configured to execute,
    on condition that it is determined that said main power supply is not turned on in said power supply determination process and said control mode is said power-on mode in said mode determination process,
    said enabling process and said disabling instruction process in the case that, in said cable determination process, it is determined that said first communication cable is attached, or
    said disabling process and said enabling instruction process in the case that, in said cable determination process, it is determined that said first communication cable is not attached.

5. A printer configured to be attached in an information transmittable and receivable manner to a cradle apparatus connected to an operation terminal via a first communication cable, comprising:
    an attach/detach part configured to attach and detach said first communication cable to said operation terminal; and
    a control part,
    said control part having, as a control mode, a power-on mode in which a main power supply of said printer is automatically turned on in the case that said printer is attached to said cradle apparatus while said main power supply is not turned on, and a normal mode in which said main power supply is not automatically turned on even in the case that said printer is attached to said cradle apparatus while said main power supply is not turned on, and wherein
    said control part is configured to further execute:
    a power supply determination process for determining whether or not the main power supply of said printer is turned on, and
    a mode determination process for determining whether said control mode is said power-on mode or said normal mode, and configured to execute,
    on condition that it is determined that said main power supply is not turned on in said power supply determination process and said control mode is said normal mode in said mode determination process,
    a disabling process for disabling a communication bus to said first communication cable included in said control part, and
    a disabling instruction process for outputting a disabling instruction to said cradle apparatus for disabling a communication bus to said first communication cable.

6. A non-transitory computer-readable recording medium storing a connection processing program for a computing part of a printer configured to be attached in an information transmittable and receivable manner to a cradle apparatus connected to an operation terminal via a first communication cable, said printer including an attach/detach part configured to attach and detach said first communication cable to said operation terminal, and said computing part, said connection processing program causing said computing part to execute
a cable determination step for determining whether or not said first communication cable is attached to said attach/detach part, and
in accordance with a determination result in said cable determination step, to selectively execute, either
(i) an enabling step for enabling a communication bus to said first communication cable included in said computing part, and a disabling instruction step for outputting a disabling instruction to said cradle apparatus for disabling a communication bus to said first communication cable, or
(ii) a disabling step for disabling the communication bus to said first communication cable included in said computing part, and an enabling instruction step for outputting an enabling instruction to said cradle apparatus for enabling the communication bus to said first communication cable.

7. A non-transitory computer-readable recording medium storing a connection processing program for a computing part of a printer configured to be attached in an information transmittable and receivable manner to a cradle apparatus connected to an operation terminal via a first communication cable, said printer including an attach/detach part configured to attach and detach said first communication cable to said operation terminal, a control part having, as a control mode, a power-on mode in which a main power supply of said printer is automatically turned on in the case that said printer is attached to said cradle apparatus while said main power supply is not turned on, and a normal in which said main power supply is not automatically turned on even in the case that said printer is attached to said cradle apparatus while said main power supply is not turned on, and said computing part,
said connection processing program causing said computing part to execute:
a power supply determination step for determining whether or not the main power supply of said printer is turned on; and
a mode determination step for determining whether said control mode is said power-on mode or said normal mode, and to execute
on condition that it is determined that said main power supply is not turned on in said power supply determination step and said control mode is said normal mode in said mode determination step,
a disabling step for disabling a communication bus to said first communication cable included in said computing part, and
a disabling instruction step for outputting a disabling instruction to said cradle apparatus for disabling a communication bus to said first communication cable.

* * * * *